Feb. 28, 1961  F. C. ARMISTEAD ET AL  2,973,471
ANALYSIS TECHNIQUES BASED ON NUCLEAR MAGNETIC RESONANCE
Filed May 8, 1953
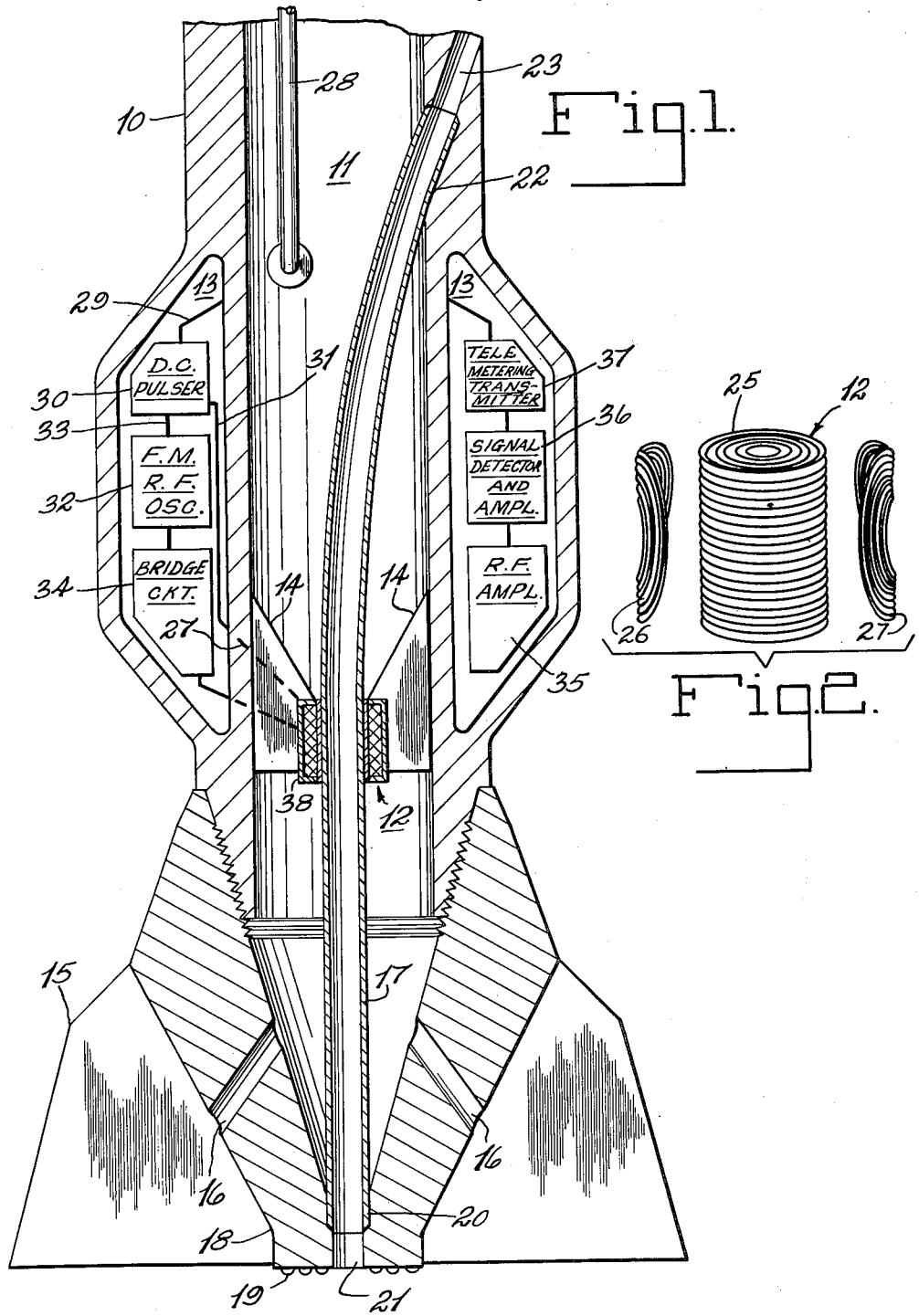

United States Patent Office 2,973,471
Patented Feb. 28, 1961

2,973,471
ANALYSIS TECHNIQUES BASED ON NUCLEAR MAGNETIC RESONANCE

Fontaine C. Armistead, Marblehead, Mass., and Arthur L. Tirico, Glen Ridge, N.J., assignors to Texaco Development Corporation, New York, N.Y., a corporation of Delaware Filed May 8, 1953, Ser. No. 353,746
19 Claims. (Cl. 324—.5)

This invention relates to analysis techniques based on nuclear magnetic resonance and more particularly to the use thereof in geophysical exploration, such as in bore hole logging.

As disclosed in copending application of Gerhard Herzog, Serial No. 238,754, filed July 26, 1951 and now abandoned, such techniques can be used to test for the presence of hydrogenous matter, such as oil and/or water, in constituents of the strata traversed by a bore hole inasmuch as the nuclei of hydrogen are among those which have certain appropriate physical characteristics including magnetic moments, angular momenta, and freedom from predominance of para magnetism on the part of the atoms and/or molecules of which the nuclei are part, over their own nuclear magnetism.

According to the art which preceded the aforementioned Herzog application, the required uni-directional magnetic field was always provided by an arrangement including, in addition to the source of magnetic flux (i.e., in addition to a magnet), (1) a pair of pole pieces spaced apart to provide an air gap of precisely predetermined volume affording a region wherein a magnetic field of high and uniform flux density could be established and wherein a sample could be located during a test, and (2) a low reluctance magnetic circuit for conducting to the air gap substantially all of the flux provided by the source. While such an arrangement has the advantage of affording adequate uniformity and density of flux it has not been used for bore hole logging because of the fact that its structure, and in particular the structure of its magnet in the forms in which it has been known in the past does not directly lend itself to insertion into a bore hole and because of the additional fact that even if it did it would be necessary to provide some kind of intricate automatic and/or remotely controllable means for taking from earth substances surrounding the bore hole samples thereof and, in situ, transporting them to and inserting them into the air gap in preparation for tests thereof.

These difficulties are avoided by the arrangements disclosed in the above-mentioned Herzog application in which a straight magnet is used as the source of magnetic flux without close-spaced pole pieces forming an air gap and without any magnetic circuit and is simply immersed in the sample (by being inserted into the bore hole) whereby the fringing flux surrounding it on all sides and extending between its ends will permeate portions of the formation disposed in all radial directions outward from the common axis of the hole and the magnet. Because of the wide distribution of the flux over a solid angle of $4\pi$ its density in any part of the sample: (1) will necessarily be very much lower than it is in the magnetic source, e.g., in a permanent bar-magnet constituting the source or in the straight soft iron core of a solenoid comprising it, and therefore frequently not nearly so high as is desirable, and (2) will necessarily be quite non-uniform over any finite portion of the sample.

Accordingly it is an object of the present invention to devise improved methods of and means for nuclear magnetic resonance analysis techniques which avoid all of the above mentioned difficulties of prior art practices.

In general this and other objects are attained by using a magnetic source of annular shape, e.g., a tubular permanent magnet or a solenoid of hollow-cylindrical or toroidal configuration, without any pole pieces forming an air gap and without any low reluctance magnetic circuit, and by locating the sample inside the magnetic source rather than to locate the source inside the sample. In effect the sample takes the place of the straight core of a simple solenoid whereby it is necessarily located in a position of maximum and substantially uniform flux density. According to a feature of the present invention a continuous core may be taken during drilling of a bore hole, the core being fed along a core barrel to and through the annular magnetic source and thence to a disposal point as rapidly as it is developed whereby periodic analyses of the core may be made by nuclear magnetic resonance techniques in which the unidirectional magnetic source itself is utilized as part of a detector head containing the sample.

In the drawing:

Fig. 1 is a longitudinal sectional view of the bottom section of a drilling stem containing apparatus embodying the present invention and with a bit affixed to its lower end for performing normal drilling and in addition thereto cutting a core to be tested for nuclear resonance characteristics; and Fig. 2 represents an exploded view of a detector head according to the present invention on a larger scale than that of Fig. 1.

The apparatus shown in Fig. 1 includes a bottom stem-section 10 which carries within its center bore 11 a tubular assembly of magnets 12 comprising the detector head of nuclear magnetic resonance apparatus embodying the present invention and also carries within an annular cavity 13 in its side walls other components of said apparatus. The assembly of magnets 12 is supported axially of the bore 11 by a number of fin-like struts 14 which bridge the space between it and the bore in different radial directions. The fins 14 should be few enough in number, i.e., sufficiently angularly spaced apart, to provide for free circulation of drilling mud down the inside of the stem-section 10 past the point at which the head 12 is mounted. At least one of the fins 14 should either be hollow or rifle-bored to provide one or more conduits (not shown) through which electrical connections may be made between elements of the detector head 12 and the other components of the apparatus which are housed within the cavity 13. To provide this cavity section 10 is formed as a double-walled structure in a region surrounding the location of the detector head 12, and is assembled, e.g., welded, around said components so as to constitute, as shown in Fig. 1, an hermetically sealed annular space. Though this will require that the stem section be somewhat enlarged it should nevertheless be sufficiently smaller than the bore hole to permit the drilling mud and cuttings to move past it and up the annulus toward the surface as is required in normal drilling. A bit 15 which is fastened to the bottom of section 10 is of a type which is adapted simultaneously to perform two types of cutting operations: (1) to cut a conventional bore hole into the earth substances which are progressively encountered as the drilling stem works its way downward, the resulting cuttings being washed loose and forced upwards by drilling mud which descends down the center of the stem, passes through a plurality of nozzles 16 and then works its way up the annulus towards the surface; and (2) to cut a continuous core and force it up a core barrel 17 to and through the assembly 12. To this end the bottom surface of the hub 18 of the bit may be studded with cutting elements 19 of some extremely hard substance such as of tungsten carbide or commercial "carbon," i.e., bort diamonds. The lower end of the core barrel 17 is retained in a recess 20 in the bit 15 to maintain it in alignment with the coring orifice 21 thereof. In the embodiment shown herein the upper end of the conduit is gradually curved to the side wall of the section 10, to a point where it enters a socket 22 which is adapted to maintain it in alignment with an ejection orifice 23 whereby portions of the core which have already passed through the detector head can be automatically disposed of by being forced into the drilling mud annulus where rotation of the stem will cause them to break off and be carried upward. In practice this curvature should be very gradual and the core should fit very loosely in the barrel to assure its smooth continuous upward movement and avoid binding. Moreover, if desired, the barrel 17 may be made perfectly straight and sufficiently long to store considerable lengths of core and/or to permit ejected portions thereof to be disposed of down the center bore 11 of the stem, thence through the nozzles 14 and eventually up the annulus, rather than through an ejection orifice at the side of the stem section (like the orifice 23) and directly up the annulus. However, in such an embodiment it will be necessary for the core to be thin enough so that broken off pieces thereof will be able to pass freely between the fins 11 and also through the nozzles 14 without causing frequent stoppages and clogging.

One suitable type of assembly 12 for embodying the principles of the present invention is shown in Fig. 2 by way of example. It comprises a principal tubular solenoid 25 for providing the high density uni-directional magnetic field which, as is well known, is needed to establish detectable nuclear magnetic resonance and two "transmitter" coils 26, 27 for providing the also needed transverse R.F. magnetic field. In order that the entire assembly may be compact and of the required tubular shape the transmitter coils 26, 27 may be wound in the form of flat spirals (like a rope is sometimes coiled on a flat surface) and these pancake windings may then be wrapped tightly around two opposite sides of the principal solenoid 25 to form a unitary structure. The coils 26, 27 may be connected together either in series or in parallel depending on which offers the more suitable input impedance for matching it to the source of R.F. energizing current.

Accordingly an embodiment of this type will have four conductors (or terminals) over which it may be connected to other components of the apparatus, i.e., two for energizing its principal solenoid 25 and two for energizing the coils 26, 27. To simplify the drawing each of these pairs of wires is represented in Fig. 1 by a single line. While it would also be possible, if desired, to add an additional "receiver" (or "pick-up") coil, or pair of coils, to the assembly 12 for embodiments of the present invention which are intended to be operative on the basis of the induction method taught by Bloch and Hansen (see U.S. Patent 2,561,489 and the article "Nuclear Induction" by Felix Bloch in the Physical Review, vol. 70, numbers 7 and 8, October 1 and 15, 1946), in practice it may be preferred to use the absorption method taught by Purcell and Pound (see the article "Relaxation Effects in Nuclear Magnetic Resonance Absorption" in The Physical Review vol. 73, No. 7, April 1, 1948, pages 679–712) since, due to the compactness of the assembly 12 and the curvature of the pancake coils, it might be difficult to attain the accuracy and balance needed to avoid direct pick-up by the receiver coil(s) from the transmitter coils. Accordingly an embodiment shown herein as preferred, but not as the only possible embodiment, is of a type based upon the absorption method.

As shown in Fig. 1 power for the apparatus may be carried down the bore hole from a source at the surface and signal information may be sent up it to indicating and/or recording devices at the surface over a cable (28) which, with the drilling mud, extends down the center bore 11 of the drill stem. Obviously, this cable must be heavily water-proofed and otherwise protected since in practice the hydrostatic pressures developed in the drilling mud can be very great. For the same reason the point of entry of the cable 28 into the cavity 13 must be very well sealed hermetically, by any suitable sort of grommet, packing, stuffing box or the like. If desired, for example for the purpose of minimizing "IR" losses in great lengths of the cable 28, the power delivered thereover may be in the form of an alternating current, in which case the components included in the cavity 13 would necessarily include rectifier and filter elements for converting it into the direct current needed to energize the principal solenoid 25. However, such an arrangement is of course not essential and therefore for the purpose of simplifying this disclosure it is being assumed that power for energizing the solenoid 25 is sent down the cable 28 in the form of direct current. This current may be fed through a pair of conductors (represented by a single line 29) to a D.C. pulser 30 which modulates it by any suitable type of electromechanical or electronic switching and in turn feeds pulses of a predetermined duration and magnitude to the solenoid 25 over the pair of wires represented at 31. The duration of the pulses should be of the same order of magnitude as the relaxation time of a spin system of protons contained in a hydrocarbon substance but of a much shorter one than the relaxation time of a spin system of similar (hydrogen) nuclei contained in water, to the end that, in accordance with a method which is more fully disclosed and is claimed in the copending application of Alexander McKay, Serial No. 352,559, filed May 1, 1953, this nuclear resonance testing technique will be selectively responsive to hydrocarbon bound protons. The unidirectional field produced by each such pulse will last long enough to cause a hydrocarbon-bound spin system, but not a water bound one, substantially to attain the desired equilibrium condition in which a slightly different number of its protons will have their precession axes in "parallel" than in "anti-parallel" alignment with the direction of the field. Accordingly, regardless of whether a signal is to be obtained by the absorption method or the induction method, it will be expedient that the transverse R.F. magnetic field, and what is more that field at exactly the correct R.F. frequency to match the nuclear resonance frequency of the system, should be made to permeate the space within the principal solenoid 25 during a short interval of time which both starts and ends before the end of the D.C. pulse. To this end: (1) the R.F. source for energizing the transmitter coils should be frequency modulated so that its output wave will pass through a certain frequency range which has been predetermind to be wide enough to be likely to include (and bracket) the resonance frequency of the spin system, for the flux density which will prevail within the solenoid 25 during a D.C. pulse, and so that it will pass through that range during the above-mentioned short interval contained in a D.C. pulse near its trailing edge; and (2) the modulation of the R.F. source should be in synchronism with the occurrence of the D.C. current pulses. Since there are numerous known ways of causing the R.F. source to function in this way and since it is not an object of this invention to devise, per se, improved ways of causing it, none of them are to be described in detail herein.

However it is noted that both the frequency modulating means and the synchronizing means may be either electromechanical or all electronic in nature, for example both the modulation and synchronization may be effected by the use of a variable air condenser whose rotor shaft is driven by a motor contained in the D.C. pulser and used therein to drive a D.C. modulating switch (if the pulser is of a motor-driven electro-mechanical type) or the modulation might be effected by the use of a saw tooth-wave-controlled reactance tube with the source of the saw tooth wave synchronized by an appropriately-timed trigger derived from the D.C. pulser.

Accordingly the D.C. pulser and the F.M. R.F. oscillator 32 shown in Fig. 1 are represented (at 33) as preferably being interconnected in some way, e.g., either mechanically or electrically. The oscillator 32, which may be energized in any suitable conventional manner by connections (not shown) to the power lines in cable 28, has its output connected to a balanced bridge load 34 comprising, in one arm elements including the transmitter coils 26, 27 and in its other arm, resistive and reactive elements adjusted and tuned in so that the impedances of the two arms will be balanced unless and until a condition of nuclear resonance is induced in the sample. As is known a transient condition of nuclear resonance will cause a momentary modulation of the R.F. signal moving through the bridge and it is possible for this modulation to be extracted to produce a signal indicative of the condition of resonance. As explained in the April 1, 1948 article mentioned above, this procedure is described as the absorption method because of the fact that the sample, in its condition of nuclear resonance, absorbs more R.F. energy from the bridge circuit than normally. As is also known, the spin system of nuclei retains this energy for only a short transient inerval of time after which it releases it as a minute transmission of R.F. field some of which can be intercepted by an appropriately positioned receiver coil, the procedure by which this is accomplished being referred to as the induction method.

Included in the apparatus contained in the cavity 13 is an R.F. amplifier whose input is appropriately coupled to the bridge 34 to sample the R.F. energy moving therethrough, including, of course, any modulations thereof which occur when nuclear resonance is occasioned, and which amplifies this sample preparatory to the detection of its modulating components. Accordingly, the output of the R.F. amplifier 35 is connected to a signal detector-amplifier 36, e.g., an arrangement of a rectifier and a low pass filter for extracting modulating components which, in the usual case, lie in the audio range, and an amplifier for the extracted signal.

While if desired, the output of the single detector-amplifier 36 can be fed directly into the cable 28, particularly if separate conductors are provided for power and signal transmission respectively, it will often prove advantageous to use one of many well known telemetering systems which are available. For example: (1) the signals may be reimpressed on a new carrier wave, e.g., one in the hundreds of kilocycles range as distinguished from the usually much higher frequency range of nuclear resonance, which is so selected that it can readily be transmitted up the same line down which power is being delivered and yet be readily separated therefrom (by filtering) and that it will suffer a minimum of attenuation due to the characteristics of that line; or (2) each signal impulse (which is produced by a transient condition of nuclear resonance) may be converted into a long D.C. pulse, e.g., by using it to trigger an Eccles-Jordan circuit, whereby it is converted into a pulse containing much more power and having much better characteristics for transmission over a long cable and yet can be used to represent the original signal impulse. However, it is to be understood that it is not an object of this invention to devise new and improved methods of and means for telemetering but on the contrary to use any which are suitable for transmitting the output of this apparatus to indicating and/or recording devices at the head of the bore hole.

For many applications no deterioration of the quality of the information derived by the apparatus shown herein, will be occasioned by using the detected signals to actuate a simple telemetering arrangement of the on-off or binary type (such as one in which the signal impulses are stretched by an Eccles-Jordan circuit), the reason for this being that the information which is derived in the first instance may be of the same, i.e., binary, character.

The information can be of this simple character because it is possible to arrange and adjust the apparatus to produce either no signals at all or signal impulses in response solely to protons, i.e., to hydrogen nuclei, and in particular solely to hydrocarbon-bound protons. The way in which it can be made to respond selectively to hydrocarbon-bond protons has already been mentioned above. Its ability to respond to protons to the exclusion of all nuclei is due to the fact that the proton with its small number (two) of Zeeman energy levels is capable of absorbing (and thereafter emitting) very much more energy from an R.F. magnetic field which is in synchronism with its own resonance frequency than any other kind of nuclei in which nuclear resonance can be induced. Because of this an apparatus can be set up so that only particular signal impulses (representative of proton resonance) which are conspicuously stronger than any others will appear as useful information at its output either because they stand out so prominently above the others that the relationship between the two is comparable to an acceptable signal-to-noise ratio, whereby those others can simply be disregarded, because the others can actually be eliminated by a conventional amplitude discriminator such as one comprising a tube having an input electrode (central grid) biased below cut-off by an amount corresponding to the largest of the noise peaks.

If the output of the oscillator 32 is adequate, for a given adjustment of the apparatus shown herein, to saturate the proton spin system of a sample in the short interval during which it is tuned to the proton resonance frequency, it will be possible to adjust the D.C. pulser 30 so that the interval between pulses is very small. This will be possible due to the fact that when a spin system is saturated it assumes an opposite equilibrium condition to the one mentioned above, namely a condition in which substantially equal numbers of protons are oriented with their precessing axes in "parallel" and "anti-parallel" relationship to the direction of the unidirectional field. Therefore if saturation is achieved at the end of each period of proton resonance, i.e., at about the end of each D.C. pulse, a spin system of water-bound protons will be as incapable of achieving the first-mentioned type of equilibrium condition during continuous cyclic operation as during an initial single pulse, and therefore the ability to discriminate between hydrocarbon-bound and water-bound protons will be preserved for continuous operation, i.e., the most, if not the only practical kind. However, if it is not possible to cause sufficient absorption of R.F. energy by the spin system to saturate it, equivalent results may be obtained by using sufficiently long intervals between the D.C. pulses for thermal effects to have time totally to eliminate any of the first mentioned condition of equilibrium which may have been impressed upon the system by and during the immediately-preceding D.C. pulses.

As is known in the prior art of using nuclear resonance techniques it has been a matter of choice whether to vary the frequency of the R.F. field or the density of the unidirectional field (over a predetermined suitable range) in order periodically to find the proper combination thereof to cause resonance of the spin system. The same choice is possible in practicing the present invention.

For example if desired, the output of the R.F. oscillator 32 may be of fixed frequency and the density of the unidirectional flux may be varied within the interval of each D.C. pulse. An appropriate way of doing this would be to energize the principal solenoid 25 with electrical pulses having a trapezoidal voltage wave-form suitable for producing current impulses of either a sawtooth or trapezoidal wave form.

While it is possible to form the assembly 12 solely of coils of coper wire which are covered with insulating material suitable for withstanding exposure to the drilling mud and in particular to the abrasive action produced by its downward flow past the assembly, it will probably be advantageous to encase it in a protective envelope, such as that represented at 38 in Fig. 1 but omitted from the exploded view of the assembly shown in Fig. 2. The inner cylindrical wall of the envelope 38 should be of a non-magnetic low-permeability material so that a preponderance of the flux contained within the solenoid will pass through the sample rather than be short circuited around it. For the same reason the core barrel 17, or at least an intermediate portion thereof which extends through the assembly 12, should be of a similar material. If desired, however, the outer cylindrical wall of the tube may have good magnetic permeability since a lowering of the reluctance in the return magnetic circuit around the outside of the solenoid should not be detrimental and in fact may be beneficial.

While in the embodiment shown herein the samples to be tested are taken from the formation as successive sections of a core which is continuously formed axially of the bore hole and is formed as an integral part of the actual boring operation, it is not essential that the cores be taken solely in this fashion. As is well known it is customary to obtain suitably shaped, i.e., cylindrical, samples of materials comprising earth strata encountered in drilling by a different process known as side coring. Therefore it is to be understood that it is within the scope of the present invention to use apparatus of the kind shown herein, and in particular to use an assembly like the assembly 12 shown herein, for testing cores taken by suitably adapted types of known side coring apparatus as well as cores taken as shown herein.

Obviously many modifications and variations of the invention, as hereinbefore set forth may be made without departing from the spirit and scope thereof and therefore only such limitations should be imposed as are indicated in the appended claims.

We claim:

1. Apparatus comprising a length of hollow drill stem, a bit attached to the bottom end of said stem for boring into earth solids upon rotation of said stem, said bit including means for cutting a core from said solids axially of the hole formed by boring, the stem and bit being so joined together that the core enters the hollow interior of said stem in a relatively upward direction as its length increases during cutting thereof, and core testing means including as one of its components a detector head of annular configuration mounted centrally within said stem axially thereof to receive said core for analysis thereof, the outside transverse dimension of said detector head being smaller than the corresponding inside dimension of said stem to permit passage of drilling fluid through the stem past the head.

2. Apparatus as in claim 1 in which the stem near to the location of said detector head therein is formed with double side walls comprising an annular cavity for housing at least one other component of said testing means and circuit means interconnecting said last mentioned component to said detector head.

3. A method of bore hole logging comprising the steps of cutting a sample of the earths solids comprising a formation as part of a drilling operation, and subsequently without withdrawing the drilling stem from the bore hole, transferring the sample from the formation into a substantially annular detector head, transmitting energy into the sample to permeate it therewith, and deriving from a coaction of said sample with the energy an electrical signal representative of a characteristic of the sample.

4. The method of claim 3 wherein the energy transmitted into the sample is adapted and arranged to produce a condition of nuclear magnetic resonance therein and wherein the electrical signal derived from the sample represents a nuclear magnetic resonance characteristic of the sample.

5. The method of logging a bore hole comprising the steps of cutting a core from the earths solids comprising a formation as part of a boring operation, and subsequently without withdrawing the drilling stem from the bore hole, transferring the core into a tubular detecting head, transmitting energy into the core to permeate it therewith, and producing in response to a coaction of the core with said energy an electrical signal representative of a characteristic thereof.

6. Apparatus for testing earth constituents within a bore hole comprising a length of hollow drill stem, a bit attached to the bottom end of said stem and actuatable thereby for boring into earth solids, means actuatable from said stem without withdrawing said bit from the hole for cutting a core from earth solids and moving it into the hollow interior of the stem, and core testing means within said hollow interior for testing therewithin earth constituents contained within said core.

7. Apparatus as in claim 6 further comprising means for ejecting from said hollow interior and into the borehole annulus surrounding said stem, core portions which have been acted upon by said testing means.

8. Apparatus as defined in claim 6 wherein said core testing means comprises a detector head for nuclear magnetic resonance analysis apparatus comprising an assembly of magnetic coils including a principal coil, having substantially the configuration of an annulus surrounding an open space and a central axis which extends therethrough, means for energizing said principal coil with a unidirectional electric current thereby to produce a unidirectional field in said space for unidirectionally magnetizing at least a sample of said core located in said space for analysis, and at least one other coil adapted to produce a magnetic field in said space transverse to said axis.

9. Apparatus as defined in claim 6 wherein said core testing means comprises a detector head for nuclear magnetic analysis apparatus comprising an assembly of magnetic coils including a principal air core solenoid for producing a unidirectional magnetic field with its flux lines extending along and through the space surrounded by the solenoid to magnetize at least a sample of said core contained therewithin, and at least one R.F. coil for producing an alternating magnetic field in and across said space.

10. Apparatus as defined in claim 6 wherein said core testing means comprises nuclear magnetic resonance testing apparatus comprising a detector head including, as a source of a unidirectional magnetic field having flux lines substantially parallel to a predetermined axis, a magnet of substantially annular configuration inside which at least a sample of said core is positionable for testing thereof.

11. Apparatus as defined in claim 6 wherein said core testing means comprises nuclear resonance testing apparatus comprising a detector head including means for producing a unidirectional magnetic field including an air core solenoid of a tubular configuration having an interior space wherein at least a sample of said core is positionable for testing, and a tubular member of a nonmagnetic low-permeability material adjacent the inner surface of the solenoid as a protective lining between it and said interior space.

12. Apparatus as defined in claim 6 wherein said core testing means comprises nuclear magnetic resonance analysis apparatus.

13. A method comprising the steps of: cutting a core from earth solids comprising a formation as part of a boring operation, and subsequently without drawing the drilling stem from the bore hole; testing the core while it is still in the bore hole to obtain information as to characteristics thereof; and transferring the information to a utilization device such as a recorder.

14. A method comprising the steps of: cutting a core from earth solids comprising a formation as part of a boring operation, and subsequently without withdrawing the drilling stem from the bore hole; testing the core while it is still in the bore hole to obtain electrical signals representative of information as to characteristics of the core; and transferring the signals to a utilization device such as an indicator.

15. An improved method of nuclear magnetic resonance testing comprising the steps: of repetitively unidirectionally magnetizing the sample during spaced-apart, equal time-intervals, permitting the magnetization to subside during equal periods by which successive intervals are spaced apart; during a terminal portion of each interval, permeating the sample with a transverse magnetic field which periodically reverses in direction at a rate which varies during said portion of the interval over a range including that at which nuclear magnetic resonance of certain nuclei will occur if they are contained in the sample; and, detecting the nuclear magnetic resonance condition of said sample.

16. An improved method as in claim 15 in which said equal periods are of such duration that enough subsidence of the unidirectional magnetization will occur during each thereof to permit the spin system of any of said nuclei which may be contained in the sample substantially to attain a condition of thermal equilibrium.

17. An improved method as in claim 15 in which said transverse field is of sufficient intensity substantially to saturate the spin system of any of said nuclei which may be contained in the sample during the transient condition of nuclear magnetic resonance thereof which will be effected during said step of permeating.

18. An improved method of nuclear magnetic resonance testing comprising the steps of unidirectionally magnetizing the sample with magnetic pulses during successive spaced-apart time intervals at a relatively low cyclic rate, permeating it during corresponding time-intervals with a transverse magnetic field which periodically reverses in direction at a relatively high rate which varies during each corresponding interval over a range including that at which nuclear magnetic resonance of certain nuclei will occur if they are contained in the sample, and detecting the nuclear magnetic resonance condition of said sample.

19. The improved method set forth in claim 18 in which said transverse field is of sufficient intensity substantially to saturate the spin system of any of said nuclei which may be contained in the sample during the transient condition of nuclear magnetic resonance thereof which will be effected during said step of permeating.

References Cited in the file of this patent

UNITED STATES PATENTS

| | | |
|---|---|---|
| 2,315,045 | Breitenstein | Mar. 30, 1943 |
| 2,337,132 | Shaw | Dec. 21, 1943 |
| 2,504,731 | Rose et al. | Apr. 18, 1950 |
| 2,561,489 | Block et al. | July 24, 1951 |
| 2,561,490 | Varian | July 24, 1951 |
| 2,580,670 | Gilbert | Jan. 1, 1952 |
| 2,721,970 | Levinthal | Oct. 25, 1955 |
| 2,820,944 | Bradley | Jan. 21, 1958 |

OTHER REFERENCES

"Physical Review," vol. 70, Nos. 7 and 8, October 1 and 15, 1946, pp. 475.

Torrey: Physical Review, vol. 76, No. 8, Oct. 15, 1949, pp. 1059–1066.

Brown: Physical Review, vol. 78, No. 5, June 1, 1950, pp. 530 to 532.